(12) United States Patent
House et al.

(10) Patent No.: US 7,991,638 B1
(45) Date of Patent: Aug. 2, 2011

(54) PROCESS FOR TRADE AREA GENERATION

(75) Inventors: Ronald Louis House, Stilwell, KS (US); Drew S. Thompson, Leawood, KS (US); Jared P. Williams, Lee's Summit, MO (US)

(73) Assignee: Sprint COmmunications Company L.P., Overland Park, KS (US)

( * ) Notice: Subject to any disclaimer, the term of this patent is extended or adjusted under 35 U.S.C. 154(b) by 579 days.

(21) Appl. No.: 11/425,526

(22) Filed: Jun. 21, 2006

(51) Int. Cl.
*G06Q 10/00* (2006.01)
(52) U.S. Cl. ..................................... 705/7.34; 705/7.33
(58) Field of Classification Search .................. 705/7.33, 705/7.34, 10
See application file for complete search history.

(56) References Cited

U.S. PATENT DOCUMENTS

| | | | |
|---|---|---|---|
| 6,272,472 B1* | 8/2001 | Danneels et al. | 705/27 |
| 7,289,814 B2* | 10/2007 | Amir et al. | 455/456.1 |
| 7,305,364 B2* | 12/2007 | Nabe et al. | 705/37 |
| 7,401,048 B2* | 7/2008 | Rosedale et al. | 705/37 |
| 7,454,412 B2* | 11/2008 | Diewald et al. | 707/3 |
| 2004/0117358 A1* | 6/2004 | von Kaenel et al. | 707/3 |
| 2005/0055275 A1* | 3/2005 | Newman et al. | 705/14 |
| 2006/0100912 A1* | 5/2006 | Kumar et al. | 705/4 |

OTHER PUBLICATIONS

"ESRI ArcUser Magazine Oct.-Dec. 1998—Coming to Terms" http://web.archive.org/web/20010218111614/http://www.esri.com/news/arcuser/1098/terms.html.*
Baker, Kim; Baker, Sunny. Divide and Conquer. Journal of Business Strategy, 20, 5, 16. Sep. 1999.*
Harmon, Debbie. Microsoft MapPoint 2002. GEO World, 14, 8, 52. Aug. 2001.*
Johnson, Dave. Map Out Your Profits. PC/Computing, v12, n2, p. 131. Feb. 1999.*
Marshall, Patrick. Review: MapPoint 200 raises the bar for desktop mapping. InfoWorld, v21, n15. Apr. 12, 1999.*
Microsoft MapPoint 2000 Delivers New Mapping and Analysis Program. PR Newswire, p. 4958. Nov. 3, 1998.*
Microsoft: MapPoint 2002 opens up a world of possibilities. M2 Presswire. Apr. 24, 2001.*
Patz, Joel T. You are here . . . and your clients are there. Home Office Computing, V17, n6, p. 44. Jun. 1999.*
Sonnen, David and Morris, Henry. Microsoft MapPoint Bringin Spatial Information Management to the Personal Productivity Market. An IDC White Paper. From www.microsoft.com/office/mappoint/evaluation/SIM_Mkbl.doc.*
Location-Based Information Can Be Turned into Business Insight With Microsoft MapPoint 2002. PR Newswire, Apr. 23, 2001.*
Cohen, Eric. Miles, Minutes and Custom Markets. American Demographics; Jul./Aug. 1996; ABI/INFORM Global p. 18.*
Dramowicz, Ela. Retail Trade Area Analysis Using the Huff Model. from www.directionsmag.com/articles/retail-trade-area-analysis-using-the-huff-model/123411.*
What's New in ArcGIS 9.1 Business Analyst. Last Revised Jul. 2005.*
Zaddack, Gerald N. Real Estate Applications for GIS: a Review of Existing Conditions and Future Opportunites. Real Estate Issues; Winter 1998/1999; 23, 4; ABI/INFORM Global p. 13.*

* cited by examiner

*Primary Examiner* — Johnna R Loftis

(57) ABSTRACT

Methods and computer-readable media having computer-usable instructions for evaluating and displaying trade information for a user. Customer addresses are received, and then a buffer area is created around each of the customer address. The buffer area for each address is combined to generate at least one aggregated area. The aggregated area is then disaggregated to define a polygon which is useful for generating a density map, indicating an ideal retail location for a new store, and determining which retail store to relocate or close.

12 Claims, 2 Drawing Sheets

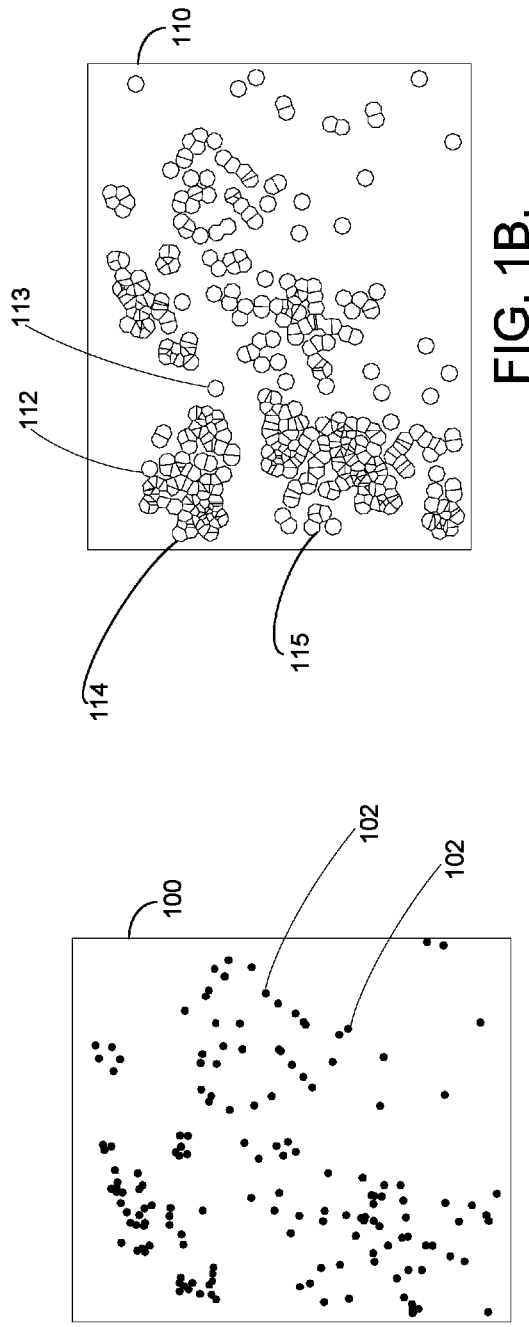
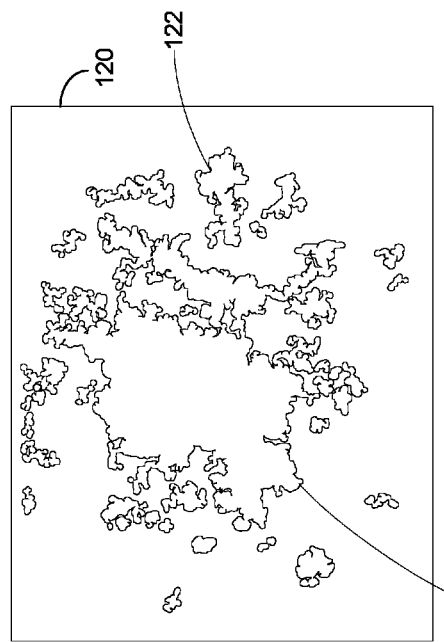
FIG. 1A.
FIG. 1B.
FIG. 1C.

PROCESS FOR TRADE AREA GENERATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

A trade database can capture a lot of information that is crucial in making many important business decisions. For instance, e-commerce data from a well-defined trade area may contain information regarding where existing customers reside and where they go to do their shopping. It may also contain information regarding where potential customers are located and how they could be better attracted to a business. The data may help find a good location for a new retail store or a customer service center. It may also help a business decide to close down or to relocate a retail store or a customer service center. Trade area data can help maximize existing business resources by freeing up resources that have been misdirected and using such resources to attract potential business or customers. For instance, a mobile communication service provider may be able to find out whether existing service subscribers are adequately served by retail stores and/or service centers that cover the area in which the subscribers reside. The service provider may also find out where in an area of interest the majority of potential subscribers are located so that it can place a new retail store or a customer service center at a location in the area near the potential subscribers, if lack of service or sales representation is a cause of failing to attract them.

Often, however, such potential benefits that are associated with utilizing trade area data are defeated because the information included is not presented in a useful way. As a result, service and sales facilities such as retail stores and customer service centers are often located too far from where existing and potential customers live and/or shop. In other circumstances, stores and/or service centers are added even though one such facility can adequately serve all of existing and potential customers. Precious resources and efforts as well as some of existing and potential customers can be lost when such sales and service facilities are misplaced as the result of faulty planning.

Currently, processes of defining trade areas rely on rather crude techniques. For example, a business often places its first sales or service facility in a busy retail outlet, e.g. a shopping mall in an area, and the next facility is located outside a radial distance from the first facility. However, this crude technique does not capture shopping habits. Nor does it capture factors that are intimately connected to buying a particular product and/or subscribing to a related service. For instance, suppose two large shopping malls are separated by a river or a large interstate highway, but are less than a mile apart from each other. Suppose further that one of the shopping mall has a mega movie theater that shows all the major movies that are currently playing. The other mall has large clothing outlets. If it is found that moviegoers are not likely to visit the clothing outlets, and vice versa, then it would make sense to put one facility in each shopping mall even though the two malls are relatively close to each other. Accordingly, there is a need for a process of evaluating trade areas that is capable of capturing the necessary details and presenting them in a way that can help a business make marketing decisions, e.g. direct staffing, invest financial resources, and establish locations where they can achieve the maximum efficiency and/or capacity.

SUMMARY

The present invention is defined by the claims below. Embodiments of the present invention solve at least the above problems by providing methods for, among other things, evaluating trade area information. In one embodiment of the present invention, the process involves receiving customer locations and creating a buffer area around each of the customer locations. The buffer area for each of the customer locations is combined to generate at least one aggregated area. At least one polygon is then defined using only the outer most boundaries of the aggregated area.

BRIEF DESCRIPTION OF THE SEVERAL VIEWS OF THE DRAWINGS

Illustrative embodiments of the present invention are described in detail below with reference to the attached drawing figures, wherein:

FIGS. 1A-C are exemplary diagrams illustrating how customer locations of an area may be manipulated to evaluate trade area information, according to embodiments of the present invention.

DETAILED DESCRIPTION

Figure 2:
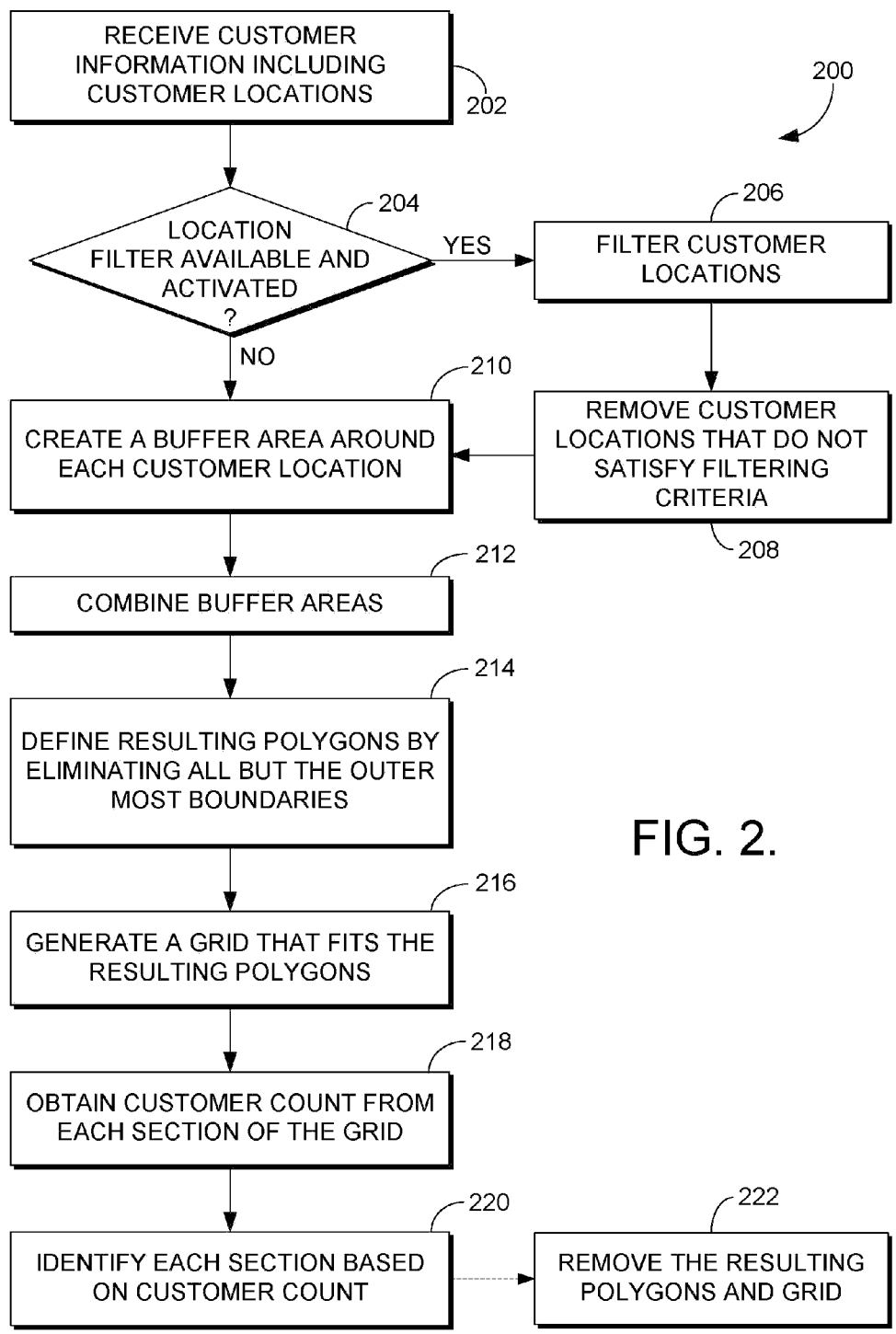
FIG. 2 is a flow diagram illustrating a method in accordance with an embodiment of the present invention for evaluating trade area information.

Embodiments of the present invention provide methods for evaluating trade area information.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Combinations of the above are included within the scope of computer-readable media.

FIGS. 1A-C are exemplary diagrams illustrating how customer locations of an area may be manipulated to evaluate trade area information, according to embodiments of the present invention. Note that each of the three figures has been generated from a different set of data. FIG. 1A illustrates an exemplary sample of customer locations in an area 100. Each location is represented by a point or dot 102. In one embodiment, a customer's location represents an address that is geographically located in the area 100 and associated with the customer's account. Customer locations may be received in a variety of formats. In one embodiment, a customer point file is received for geographical display of customer locations. In another embodiment, a text file containing customer addresses is received to be mapped for a display.

FIG. 1B illustrates a plurality of aggregated areas 114, 115 located in an area 110. In this embodiment, a buffer area 112 is created around each of customer locations (like points 102 shown in FIG. 1A) and the resulting buffer areas 112 are combined to form the aggregated areas 114, 115. In one embodiment, the radius of each buffer area 112 is selected to be about 0.25 miles. Some buffer areas 112 may be filtered out, if desired. In one embodiment, isolated individual buffer areas 113 that do not form a part of an aggregated area 114, 115 may be removed. In another embodiment, an aggregated area made up of a small number of buffer areas 115 which are located in close proximity to a major aggregated area 114 may be integrated into the major aggregated area 114. Then such major aggregated areas 114 might be disaggregated as shown in FIG. 1C.

FIG. 1C illustrates a plurality of exemplary polygons 122 that represent the trade area in an area 120. The polygons 122 are formed from aggregated buffer areas 114, 115, as shown in FIG. 1B, which are then disaggregated as shown in FIG. 1C. In one embodiment, all but the outer most boundaries of the aggregated areas 114, 115 are removed to define the polygons 122. In summary, location points 102 are generated as shown in FIG. 1A. Then buffer areas 112 are created to form aggregated areas 114, 115 as shown in FIG. 1B. Finally, polygons 122 are defined from the aggregated areas 114, 115 as shown in FIG. 1C.

FIG. 2 is a flow diagram illustrating a method 200 in accordance with an embodiment of the present invention for evaluating trade area information. FIGS. 1A-C will be referred to along with FIG. 2 to illustrate some aspects of the method 200. At 202, the method 200 receives customer information. The customer information may include data relating to customer locations. In one embodiment, customer locations that are associated with a particular area may be read in from a customer point file or a spatial object that can be graphically displayed as shown in FIG. 1A. In another embodiment, the information includes customer locations that are associated with a retail store or a local service center and may be read in from a text file. Customer locations can be obtained in a variety of ways according to various embodiments of our technology. The customer information may also include an account information and transaction records. In one embodiment, the customer information includes customer credit ratings. In another embodiment, the customer information includes previous addresses of customers and information regarding address changes.

At 204, the method 200 determines whether at least one location filter is available and active. In one embodiment, location filters are used to remove customer locations in accordance with filtering criteria. For example, suppose a telecommunication service provider wishes to determine whether a local retail store covering a populated area must be relocated, and thus wishes to define a trade area that is associated with the particular retail store. In other words, the provider wishes to limit the perimeters of the trade area so that it encompasses only the customers who are likely to be served by the particular retail store. Therefore, information of those customers who are not likely to be served by the retail store are removed so that the trade area can be defined more accurately. Suppose that the retail store is located in Kansas City area. Further suppose that a customer who resides in Chicago, Ill. happened to have his mobile phone serviced in the retail store while visiting Kansas City for just few days. That customer, for all likelihood, is not going to come back to Kansas City again for further assistance or service. By removing that customer and similarly situated customers from the list of customers who are associated with the retail store by filtering, the resulting data can define the geographic customer base more accurately.

Location filters may employ a variety of filtering criteria to better fit purposes for which a trade area may be defined. In one embodiment, for example, a driving distance and/or driving time from a retail store or local service station may be used as a filtering criterion. For instance, information of only those customers who reside within 20 minutes of driving time or within 10 miles of driving distance to a retail store may be used to define a trade area for the retail store to predict the impact of closing down or relocating the retail store more realistically. In another embodiment, the nature of a past transaction may be used as a filtering criterion. For instance, transaction records could be filtered so that it is restricted to those customers who purchased a mobile phone and/or who subscribed to services at a retail store, whereas customers who came to the retail store to make payments are excluded. In yet another embodiment, the frequency of past transactions may be used as a filtering criterion. For instance, information of only those customers who have visited a retail store more than once may be used to determine a new location for a retail store.

If the method 200 determines that at least one location filter is available and active, customer locations are filtered at 206. At 208, those locations that have been filtered out by the location filter are removed. If, however, the method 200 determines either that there is no location filter or that none of available filters is yet activated, all the customer locations that have been received at 202 are used to define a trade area. SQL may be used to filter out data such as customer locations. In one embodiment, for example, a SQL SELECT clause may be used to filter out customer locations in a database that fall outside of a set of conditional parameters in a SQL WHERE clause. At 210, the method 200 creates a buffer area 112 around each of the customer locations as shown in FIG. 1B. In one embodiment, the radius of the buffer area is about 0.25 miles. In another embodiment, the radius of the buffer area may be between 0.2 miles and 0.29 miles.

At 212, the buffer areas 112 that are created for each of the customer locations at 210 are combined to form at least one aggregated area 114. At 214, the method 200 disaggregates the aggregated area 114 to define polygons 122 that may represent a trade area as shown in FIG. 1C. In one embodiment, the method 200 disaggregates by removing all but the outer most boundaries of the aggregated area 114. Additional layers may be used to help a user make decisions. A variety of tools could be used in connection with carrying out embodiments of our invention including aspects of the processing tasks described herein. For example, commercial software tools such as MapInfo, MapGuide, and Raster Workshop could be used in connection with our technology. For instance, MapInfo provides its own script language and a library of graphical functions that can be invoked by another application program. Components implementing the processing tasks described herein may include commercial software tools, applications, scripts, and libraries. However, there are other system components that may be used to accomplish tasks. There are also other tools that offer similar system components. Returning to the telecommunication service provider example, suppose that the provider wishes to find out an ideal location for a new retail store in a city area. Say the provider wishes to obtain a trade area that encompasses the particular city area and that includes all the customers therein. Once the polygons 122 are defined, the method 200 may use layers containing different information to help the provider determine the ideal location for the new retail store. In one embodiment, the method 200 may utilize layers containing graphical items such as, but not limited to, streets, lakes, ponds, public parks, schools, and shopping malls. In another embodiment, the method 200 may utilize layers containing the locations of retail stores owned and/or operated by the provider's competitors. By including a competitor-locations layer, a new store location can be placed after considering both current customer habits as well as competitive advantage.

At 216, the method 200 generates a grid that fits the polygons 122 generated at 214. In one embodiment, the method 200 overlays the polygons 122 with a grid of sections with length of about 0.25 miles. In another embodiment, the method 200 uses a grid of sections with length between 0.2 miles and 0.29 miles. In yet another embodiment, the method 200 overlays the polygons 122 with a grid of squares. At 218, the method 200 obtains a customer count from each section of the grid. In one embodiment, the method 200 counts the number of customer locations that fall within each square of an overlaid grid of squares.

At 220, the method 200 identifies each section of the grid based on the customer counts. Method 200 also can use different colors to identify each square of an overlaid grid of squares. For instance, red could be used for a customer count between 150 and 200 and pink could be used for a customer count between 50 and 100. Alternatively, distinctive shading could be used to identify different customer counts for each section of a grid. In yet another embodiment, the method 200 may use both different colors and shades. The method 200 may also distinguish sections of the grid for reasons other than, and in addition to customer counts. In one embodiment, method 200 may use customer information such as customer credit ratings. For example, different colors could be used to indicate customer counts while different shades are used to indicate customer credit ratings, thereby allowing the provider to target a specific segment of customers. For example, a user might select high end products for placement in a shaded area which indicates high credit ratings. In another embodiment, the method 200 may use customer information regarding address changes and previous addresses of customers. For instance, different shades may be used to indicate customer counts while different colors may be used to indicate the length of residency of customers. By comparing shades and colors for a given area at different times, the provider may also learn moving trends of its customers over a time period. For instance, the provider may learn that its most targeted class of customers is gradually moving out of city areas and into urban residential areas near cities. This information would help the provider more adequately adapt to these transitions.

At 222, the method 200 may remove the polygons 122 and the grid, leaving only the colors, shades, or yet another means used to identify each section of the grid. In one embodiment, the colored squares of a grid are further smoothed out to generate a density map within a particular area. The method 200 may be used to define accurate geographical trade information for cities, states, and even the entire nation. The method may be also used to accurately evaluate and display trade information for any randomly chosen populated area.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art, upon reading this disclosure, that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media having computer-usable instructions embodied thereon that, when executed, enable a given computer to perform a method of presenting information that is useable to help identify a prospective location of a physical retail store, the method comprising:
  receiving customer-demographic information that includes customer point locations, each of which indicates a geographic point location of a customer who is within a given geographic area;
  creating a buffer zone of at least a minimum radius around each of said customer point locations;
  combining on the given computer said buffer zone for each of said customer point locations to form at least one aggregated area, which is characterized by a perimeter;
  defining at least one polygon using the perimeter; and
  displaying said at least one polygon to represent a trade area, at least a portion of which is within said given geographic area
  (1) wherein said at least one polygon indicates customers who have the potential to be served by the particular retail store, and
  (2) wherein said displaying includes visually enhancing said polygon to depict attributes of said trade area that assist with determining said prospective location of said physical retail store.

2. The computer-readable media of claim 1, further comprising:
  removing one or more of said customer point locations using at least one filtering criterion derived by evaluating said customer information.

3. The computer readable media of claim 2, wherein said at least one filtering criterion comprises a predefined driving distance from at least one predefined store location.

4. The computer readable media of claim 2, wherein said at least one filtering criterion comprises a particular transaction made by a customer associated with one of said customer point locations.

5. The computer-readable media of claim 2, wherein said at least one filtering criterion comprises a frequency of activities transacted by a customer associated with one of said customer point locations.

6. The computer-readable media of claim 1, wherein said minimum radius is about 0.25 miles.

7. The computer-readable media of claim 1, wherein said trade area comprises a populated area.

8. The computer-readable media of claim 1, wherein said customer-demographic information comprises a customer point file.

9. The computer-readable media of claim 1, wherein said customer-demographic information comprises a spatial object.

10. The computer-readable media of claim 1, wherein said visually enhancing comprises:

generating a grid comprising a plurality of sections, said grid encompassing said at least one polygon;

obtaining a customer count from at least some of said plurality of sections of said grid; and separately identifying each of said at least some of said plurality of sections in accordance with said customer count.

11. The computer readable media of claim 10, wherein the length of a side of each of said plurality of sections is about 0.25 miles.

12. The computer readable media of claim 10, wherein said each of said at least some of said plurality of sections is identified using a coloring scheme.

* * * * *